Aug. 19, 1969   J. H. RICHARDS ET AL   3,462,264
SULPHUR INFUSION OF MOLTEN METAL
Filed April 18, 1968   2 Sheets-Sheet 1

INVENTORS.
JOHN HARVEY RICHARDS
JOHN FREDERICK CASTLE
BY
ATTORNEYS

United States Patent Office 3,462,264
Patented Aug. 19, 1969

3,462,264
SULPHUR INFUSION OF MOLTEN METAL
John Harvey Richards and John Frederick Castle, Avonmouth, England, assignors to Metallurgical Processes Limited, Nassau, Bahamas, a corporation of the Bahamas, and Imperial Smelting Corporation (N.S.C.) Limited, London, England, a British company
Continuation-in-part of application Ser. No. 371,995, June 2, 1964. This application Apr. 18, 1968, Ser. No. 722,459
Claims priority, application Great Britain, June 6, 1963, 22,526/63
Int. Cl. C22b 13/06
U.S. Cl. 75—78  12 Claims

ABSTRACT OF THE DISCLOSURE

An apparatus with a molten sulphur supplying conduit connects a treating chamber for purifying a body of impure molten metal confined therein, the molten sulphur being vaporized in the conduit and brought into contact with the molten metal to convert its metal impurities into removable sulphur compounds.

---

The present application is a continuation-in-part of our copending application Ser. No. 371,995 filed June 2, 1964, now abandoned.

The invention relates to a process for introducing sulphur into molten metal, and more especially but not solely for introducing sulphur into a body of molten lead. Sulphur is introduced into molten lead for the purpose of forming a sulphide or matte layer with other metals present in the lead (as impurities, especially copper).

The process of the present invention can be used to add the sulphur below the surface of the lead, or at least below the surface of a matte layer already present, and avoids, or minimizes, the loss of sulphur as sulphur vapour or sulphur dioxide from the surface of the metal.

An associate of the applicants has already proposed a method and apparatus for removing copper (and sulphur and arsenic) from lead in which copper-containing lead is fed into a vessel containing a body of lead through a matte layer at the top of the lead, and sulphur is added to the lead so that the matte layer builds up and is from time to time run off. See the copending application of T. R. A. Davey, Ser. No. 302,192 filed Aug. 14, 1963, now Patent No. 3,317,311. That application and our present application are assigned to the same assignee. In that earlier proposal, it was envisaged to remove the remaining traces of copper in the lead (together with arsenic, as copper arsenide) by drastically cooling the lower portions of the walls of the vessel from time to time so that solid lead would form banks of solid lead on the cooled lower portions and trap copper and copper arsenide physically within the banks of solid lead. When the banks of solid lead were melted off, the copper and arsenides rose upwardly through the body of molten lead to join the matte layer. Meanwhile, substantially pure lead could be continuously removed from the bottom of the vessel.

The present invention can be used for adding sulphur to the lead in such a vessel, although it is not intended to restrict its application solely to this.

The problem of introducing elemental sulphur beneath the surface of molten lead presents many difficulties. Liquid sulphur is very viscous in the temperature range 160° C.–280° C. and various attempts made at introducing sulphur by passing the molten material down a pipe projecting into the lead have met with failure due to:

(a) The extremely high viscosity of sulphur in the temperature range 160° C.–280° C. causing blockages in the pipe.
(b) A layer of solid lead sulphide blocking the end of the pipe.

The present invention involves a process for introducing sulphur into molten metal, in which molten sulphur at a temperature below its viscous range is fed into an enclosure open towards, and closed by, the surface of the metal, the enclosure being maintained at such a temperature that the sulphur introduced is vaporized so as to be readily taken up by the metal.

Usually, the molten metal will be molten lead. When this has a matte layer at the top, the enclosure may be closed by the surface of the matte layer, and not dip into the lead at all. This will clearly depend on the thickness of the matte layer.

In a preferred way of carrying out the method of the invention, a body of molten sulphur is held at a temperature below its viscous range and feeds a continuous circuit of such molten sulphur from which molten sulphur is introduced into the enclosure, either as a continuous bleed or intermittently, provided that in this latter case too much sulphur is not fed in at one time since this would cause bubbling of sulphur vapour out of the end of the tube.

In the method of the present invention the sulphur does not pass through its viscous range in any restricted channel; and, furthermore, the reaction of the vapour with hot lead is sufficiently exothermic to allow lead sulphide to be formed in the liquid state, hence eliminating difficulties due to formation of solids which would otherwise cause blockages in the vaporizing enclosure.

The circulation of the molten sulphur at a constant temperature through a needle valve-block allows the valve to be kept clear of blockages due to solidification of sulphur or the formation of a viscous liquid within the circuit. The valve can quite simply be kept free of solid particles blocking the orifice by screwing the needle up and down a number of times.

The invention is particularly useful for removing copper from copper-containing molten lead, and in this form of the invention sulphur may be introduced into the molten lead by the method just described, so that the sulphur introduced reacts with the copper present to form a matte.

This may be carried out in combination with the continuous copper-drossing method described in outline above. An example is given below of the operation of the present method in such a copper-drossing process.

The novel apparatus used is a further feature of the present invention, which accordingly further consists in apparatus for introducing sulphur into molten metal, comprising a vessel for holding a body of the molten sulphur at a temperature below its viscous range; a pump for pumping molten sulphur out of the vessel into a circulating line which empties back into the vessel; a valve in the circulating line which can be opened to release molten sulphur; and an enclosure connected to the valve within which the molten sulphur released by the valve can vaporize.

Any valve in the circulating line can on use be maintained at a constant predetermined temperature by circulation of molten sulphur through it.

A restricting device may be provided downstream of the valve in the circulating line, to pressurize the circulating line and improve the introduction of the sulphur into the enclosure when the valve is opened and closed. Often, however, the resistance to flow of the circulating line itself will be sufficient for this purpose.

A convenient form of enclosure is constituted by a vertical pipe closed at the top. In the whole installation such a pipe has the valve for releasing sulphur at the top and extends through the roof of a closed vessel for containing the molten metal, so that when the vessel is filled with molten lead the open end of the pipe dips beneath the surface.

The invention will be further described with reference to the accompanying diagrammatic drawings.

Figure 1:
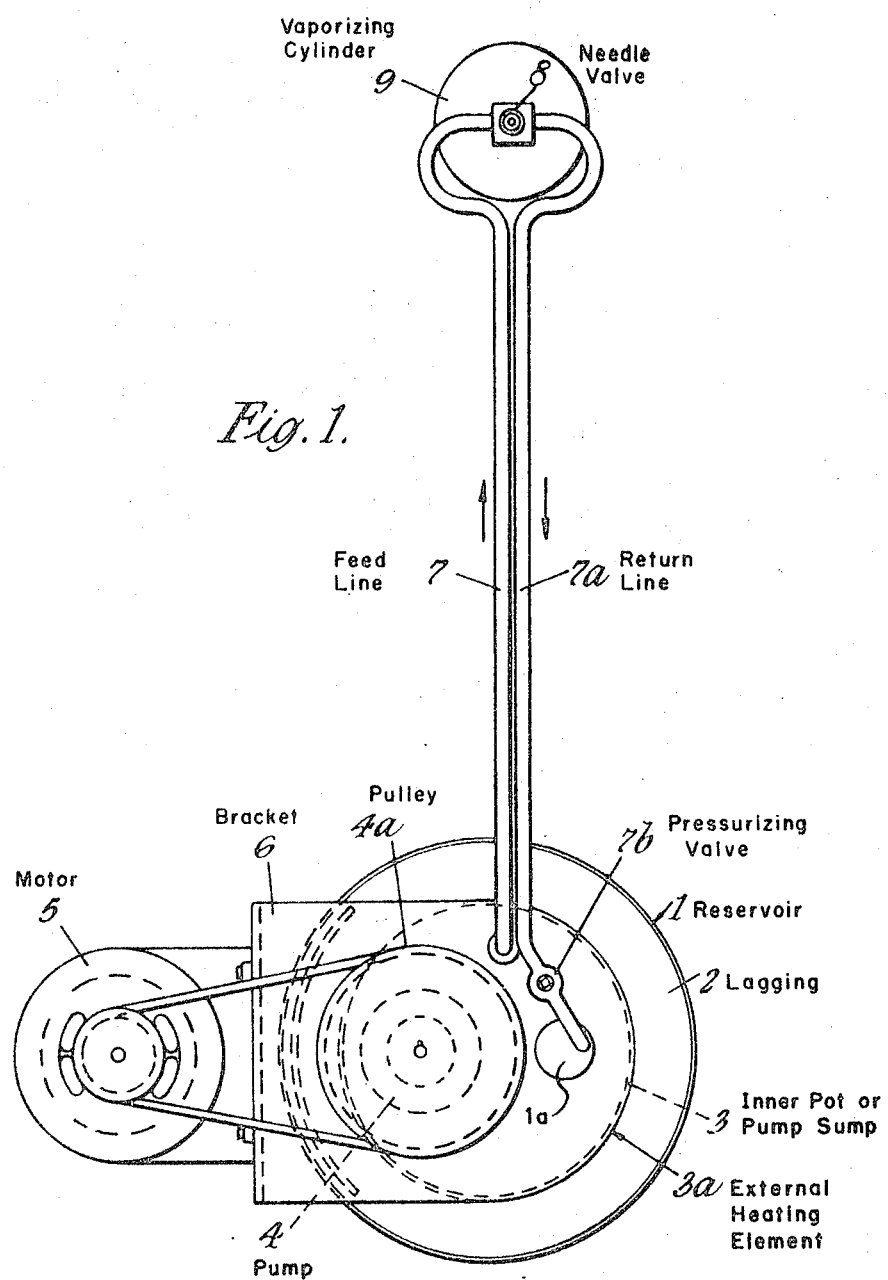
FIGURE 1 is a plan view of apparatus according to the invention.

A quantity of elemental sulphur is initially melted in a pot, not shown, and is pumped or poured (FIG. 1) as required into the reservoir 1, via inlet 1a, which has lagging of insulation 2 wound around its external surface.

The inner pot or pump sump 3 has an external heating element 3a whereby the temperature of the sulphur may be thermostatically controlled. Into the sump 3 there dips a pump 4, conveniently of the gear type, which is driven via its pulley 4a by means of an electric motor 5 secured to a bracket 6 on the melting pot 1.

The pump 4 supplies a pump or feed line 7 which extends to a needle valve 8 and then via return line 7a back to the sump 3 to be picked up by the pump.

Figure 2:
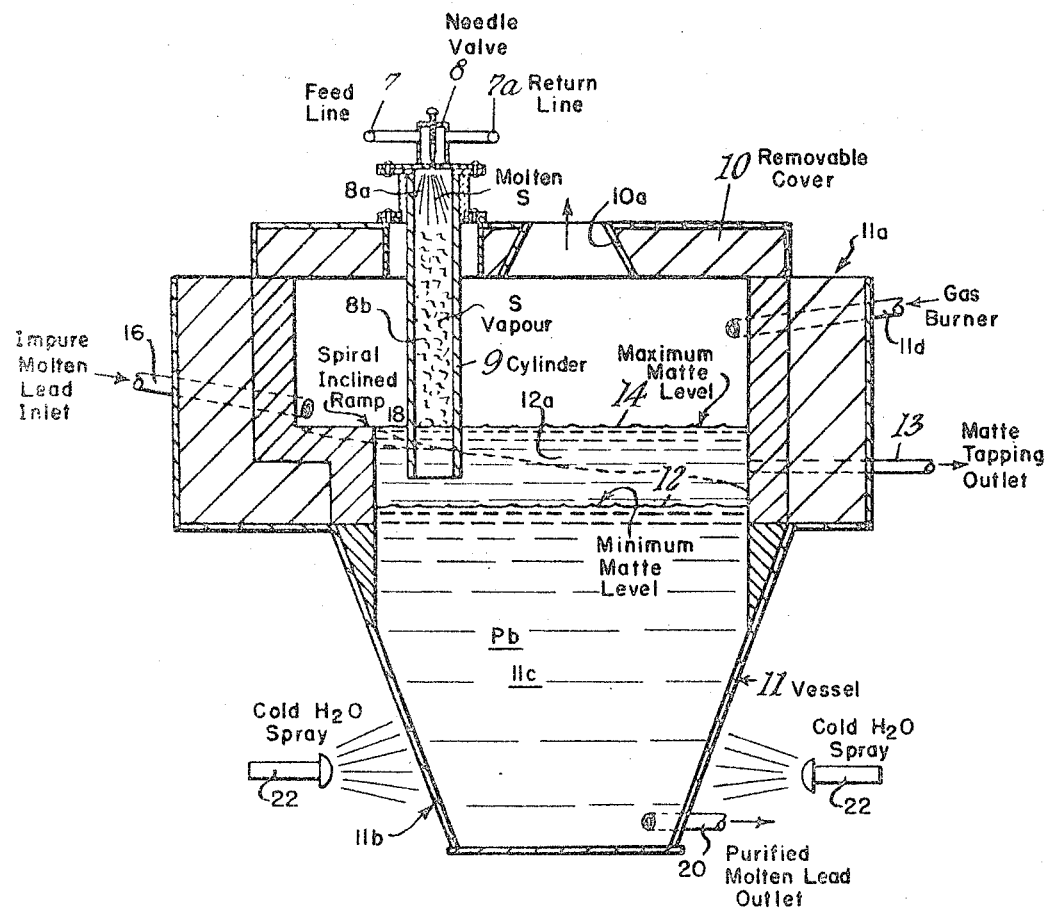
FIGURE 2 is a section through the vaporizing enclosure in position in a vessel containing molten lead.

Needle valve 8 is secured to the top of a cylinder or conduit 9, constituting a vaporizing enclosure (FIG. 2), open at the bottom and mounted in a removable cover 10, having a constricted vent 10a for the escape of spent gases from a vessel 11, which has a generally circular upper insulated section 11a and an inverted frusto-conical lower uninsulated section 11b, containing impure molten lead 11c.

The bottom of the cylinder 9 may extend into the lead below the minimum matte level 12 of the furnace, but in a preferred mode of operation the bottom of the cylinder is located within the matte layer, i.e. above the level 12 and below the maximum matte level 14. The matte tapping hole is shown at 13 and the maximum matte level at 14.

In operation (FIG. 1) molten sulphur at a temperature of say 130° C.–140° C. is circulated continuously round the pump line 7, 7a from the sump 3.

By opening the needle valve 8 liquid sulphur 8a is allowed to enter the vaporizing enclosure constituted by cylinder 9 which may be of graphite or cast refractory, possibly about six inches in diameter with its end (FIG. 2) extending about 3" into the matte layer 12a. Cylinder or conduit 9 is heated by its presence in the insulated section 11a heated internally by gas burner 11d and by exothermic heat produced when sulphur vapour reacts with the metal impurities in the molten lead, or some of the lead itself, as pointed out below.

The liquid molten sulphur 8a entering cylinder or conduit 9 is evaporated very rapidly (flash evaporated) and the sulphur vapour 8b so formed travels down the cylinder or conduit to react with the molten lead 11c in the lower portion of the cylinder or conduit. In the example shown by way of the sulphide or matte layer 12a, in exothermic reaction to give molten lead sulphide or lead sulphide/copper sulphide mixture (i.e. more matte).

The liquid lead sulphide reacts with copper, copper arsenide, and other matte forming metals present in the lead to give mattes of the desired composition. In this way the sulphur can be made to react with the copper present in the lead and does not burn off as sulphur dioxide on the surface of the metal.

Notwithstanding the fact that only a small surface is exposed to the sulphur vapour at the bottom of cylinder or conduit 9, the applicants have found that efficient mixing does in fact take place, probably due to the fact that only sulphur vapour comes into contact with the metal.

The motion of the matte in the vessel is conducive to the continual exposure of a fresh surface to the vapour and to the transfer of copper in the lead to copper sulphide in the matte, the matte being rich in sulphur.

The lead sulphide formed at the lower end of the cylinder or conduit 9, by the reaction of sulphur vapour with the molten lead, is very much lighter than the lead from which it is formed and tends to rise rapidly to the lead/matte interface. If, on the other hand, the cylinder dips only into the matte layer the sulphur will react with copper compounds in this layer, making it rich in sulphur. The input impure molten (bullion) lead comes into intimate contact with the matte layer, on introduction into the vessel, and the copper in this lead will therefore have a chance to react with the sulphur, forming matte particles which will eventually rise again to the matte layer and dissolve in this layer.

In the vessel shown, impure molten lead is charged through inlet 16 onto a narrow spiral inclined ramp 18 through the matte layer continuously so that the sulphur in the matte can readily react with the lead. It has been outlined above that the lead, from which copper has been removed to a large extent by the addition of sulphur according to the invention, sinks in the vessel because it is being run off at a low temperature through purified lead outlet 20 at the bottom of the vessel; from time to time the lower tapering walls of the vessel are chilled by spaced cold water sprays 22 to cause accretions of solid lead which trap the copper and copper arsenide and are periodically melted off. The copper and arsenide in the accretions then float up to form the matte layer.

The sulphur circulation line can be pressurized by means of a restricting device (e.g. valve 7b) in the return line. In operation, however, it has been found that the resistance of the return line is sufficient to force sulphur through the valve in adequate quantities so that no further pressurizing is necessary.

The cylinder 9 may be of graphite, cast chrome-magnesite, plumbago, or cast silicon carbide. A reducing atmosphere is maintained in the furnace top so that attack of the cylinder 9 by the furnace atmosphere is minimized.

As indicated above, the sulphur vapour may be made to contact the molten metal to be purified, or the molten layer of matte on top of the body of molten metal to be purified, but for the reasons stated we prefer to make the vapour contact the matte. In the claims to follow the words metal and matte may of course be used interchangeably, where the context admits of such use.

Various modifications may be made within the scope of the invention.

We claim:

1. In the method of introducing sulphur into molten metal, wherein the molten metal contaminated with metal impurities is fed into a confined treating zone, the sulphur is introduced into the resulting body of impure molten metal to bring about a reaction between the sulphur and the metal impurities to convert the impurity metals into sulphur compounds of those metals, the resulting impurity metal-sulphur compounds are permitted to rise to the top of the body of impure molten metal to form a layer of molten matte thereon, molten matte is withdrawn from the layer, and purified molten metal is withdrawn from the bottom portion of the treating zone, the improvement in combination therewith which comprises:
   (a) rendering the sulphur in molten form and keeping it at a temperature below its viscous range;
   (b) feeding the molten non-viscous sulphur into a confined sulphur zone directly above, but in close interface communication with, the body of impure molten metal in the confined treating zone;
   (c) maintaining the confined sulphur zone at a temperature sufficiently high to promptly vaporize the molten non-viscous sulphur fed therein; and
   (d) bringing the resulting sulphur vapour into reactive contact with the impure molten metal to produce said desired impurity metal-sulphur compounds.

2. Method according to claim 1, in which the sulphur zone provides a small but effective area of interface communication of the sulphur vapour with the relatively large surface area of the body of impure molten metal undergoing treatment.

3. Method according to claim 1, in which the molten sulphur is fed into the confined sulphur zone at a rate and pressure below that at which resulting sulphur vapour forms bubbles that pass downwardly through the closed interface and laterally beyond the sulphur zone over into the main body of impure molten metal.

4. Method according to claim 1, in which the molten sulphur is fed substantially continuously into the confined sulphur zone.

5. Method according to claim 1, in which the molten sulphur is fed intermittently into the confined sulphur zone.

6. Method according to claim 1, in which the molten sulphur is fed at a substantially constant temperature into the confined sulphur zone.

7. Method according to claim 1, in which the closed interface is between the sulphur vapour portion of the sulphur zone and the layer of molten matte on the main body of impure molten metal.

8. Method according to claim 1, in which the molten sulphur is derived from elemental sulphur; the elemental sulphur is fed into and heated in a confined heating zone to a temperature sufficiently high to melt and maintain it below its viscous range; the resulting molten sulphur is pumped away from the heating zone at a predetermined rate and under a predetermined pressure into said confined sulphur zone where it is vaporized.

9. Method according to claim 1, in which the molten sulphur is derived from elemental sulphur; the elemental sulphur is fed into and heated in a confined heating zone to a temperature sufficiently high to melt and maintain it below its viscous range; a stream of the resulting molten sulphur is pumped away from the heating zone at a predetermined rate and under a predetermined pressure through a closed circuit back to the heating zone to keep the molten sulphur at a substantially constant predetermined temperature; and a controlled amount of the molten sulphur is bled as such from the circuit into said confined sulphur zone where it is vaporized.

10. Method according to claim 1, in which the body of impure molten metal is kept in a confined treating zone having a freeboard space above the body of molten metal; the freeboard space is heated with burning gases sweeping therethrough; and the gases in the freeboard space are reduced to minimize harmful oxidation effects within the treating zone.

11. Method according to claim 1, in which the impure molten metal is lead.

12. Method according to claim 1, in which the impure molten metal is lead contaminated with copper; and the sulphur reacts with the molten copper to form a layer of matte on the top of the main body of molten lead.

References Cited

UNITED STATES PATENTS

| | | | |
|---|---|---|---|
| 2,005,540 | 6/1935 | Fleming et al. | 75—93 X |
| 2,217,981 | 10/1940 | Hallows | 75—78 |
| 3,041,162 | 6/1962 | Euster | 75—78 |
| 3,063,828 | 11/1962 | Booth et al. | 75—93 X |
| 3,260,592 | 7/1966 | Davey et al. | 75—78 |
| 3,317,311 | 5/1967 | Davey | 75—93 |

L. DEWAYNE RUTLEDGE, Primary Examiner

G. K. WHITE, Assistant Examiner

U.S. Cl. X.R.

75—76, 93

PO-1050
(5/69)

UNITED STATES PATENT OFFICE
CERTIFICATE OF CORRECTION

Patent No. 3,462,264          Dated August 19, 1969

Inventor(s) John Harvey Richards and John Frederick Castle

It is certified that error appears in the above-identified patent and that said Letters Patent are hereby corrected as shown below:

Column 6, line 13, "reduced" should read -- reducing

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents